US012738984B2

(12) United States Patent
Bao et al.

(10) Patent No.: US 12,738,984 B2
(45) Date of Patent: Sep. 15, 2026

(54) OVERHEAD REDUCTION IN RECONFIGURABLE INTELLIGENT SURFACE (RIS)-AIDED ULTRA-RELIABLE AND LOW LATENCY (URLLC) SYSTEMS

(71) Applicant: LENOVO (BEIJING) LIMITED, Beijing (CN)

(72) Inventors: Tingnan Bao, Beijing (CN); Jianfeng Wang, Beijing (CN); Haiming Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 311 days.

(21) Appl. No.: 18/705,230

(22) PCT Filed: Oct. 29, 2021

(86) PCT No.: PCT/CN2021/127241
§ 371 (c)(1),
(2) Date: Apr. 26, 2024

(87) PCT Pub. No.: WO2023/070482
PCT Pub. Date: May 4, 2023

(65) Prior Publication Data
US 2025/0015840 A1 Jan. 9, 2025

(51) Int. Cl.
*H04B 7/04* (2017.01)
*H04B 17/309* (2015.01)

(52) U.S. Cl.
CPC ....... *H04B 7/04013* (2023.05); *H04B 17/346* (2023.05)

(58) Field of Classification Search
CPC .. H04B 7/04; H04B 7/04013; H04B 7/04026; H04B 7/0404; H04B 7/0408; H04B 7/0413; H04B 17/346; H04B 7/15528; G01S 2013/0236; G01S 2013/0245; G01S 2013/0254; G01S 2013/0263; G01S 2013/0272; H04W 24/02
See application file for complete search history.

(56) References Cited

U.S. PATENT DOCUMENTS 12,160,285 B2 * 12/2024 Åström .............. H04B 7/04013
2016/0380176 A1 12/2016 Kishino
2021/0013619 A1 * 1/2021 Alkhateeb .......... H04B 7/04013
(Continued)

FOREIGN PATENT DOCUMENTS

CN 113225753 A 8/2021
CN 113452642 A 9/2021

OTHER PUBLICATIONS

Yang et al., Coverage, Probability of SNR Gain, and DOR Analysis of RIS-Aided Communication Systems, IEEE, 5 pages, Aug. 2020.*
(Continued)

*Primary Examiner* — Frank Duong
(74) *Attorney, Agent, or Firm* — AMPACC Law Group, PLLC

(57) ABSTRACT

Methods and apparatuses for reducing the overhead in RIS-aided URLLC system are disclosed. A method comprises determining, by applying delay outage rate (DOR) metric, an active number of reflecting elements at an RIS between the base station and a UE in an RIS-aided URLLC system; and setting the active number of reflecting elements to the RIS.

6 Claims, 4 Drawing Sheets

(56) References Cited

U.S. PATENT DOCUMENTS

| | | | | |
|---|---|---|---|---|
| 2023/0308139 | A1* | 9/2023 | Baligh | H04B 7/04013 |
| 2023/0421412 | A1* | 12/2023 | Zegrar | H04B 7/086 |

OTHER PUBLICATIONS

Wang et al., A New Channel Estimation Strategy in Intelligent Reflecting Surface Assisted Networks, arXiv, 8 pages, Jun. 22, 2021.*

International Search Report and Written Opinion dated Jul. 27, 2022 for International Application No. PCT/CN2021/127241.

G. Sun et al. "A 3D Geometry-Based Non-Stationary MIMO Channel Model for RIS-Assisted Communications", Published in: 2021 IEEE 94th Vehicular Technology Conference; Sep. 27-30, 2021; 5 pages.

Beixiong Zheng et al. "A Survey on Channel Estimation and Practical Passive Beamforming Design for Intelligent Reflecting Surface Aided Wireless Communications", arxiv.org, Cornell University Library, 201 Olin Library Cornell University Ithaca, NY 14853, Oct. 4, 2021; 68 pages.

Fangqing Jiang et al. "Channel Estimation via Direct Calculation and Deep Learning for RIS-Aided mmWave Systems", arxiv.org, Cornell University Library, 201 Olin Library Cornell University Ithaca, NY 14853, Aug. 2, 2020; 5 pages.

European search report dated Jun. 2, 2025 for European Patent Application No. 21961847.7.

* cited by examiner

OVERHEAD REDUCTION IN RECONFIGURABLE INTELLIGENT SURFACE (RIS)-AIDED ULTRA-RELIABLE AND LOW LATENCY (URLLC) SYSTEMS

CROSS REFERENCE TO RELATED APPLICATIONS

This application is a national phase entry of International Application No. PCT/CN2021/127241, filed on Oct. 29, 2021, which is incorporated by reference in its entirety.

FIELD

The subject matter disclosed herein generally relates to wireless communications, and more particularly relates to methods and apparatuses for reducing the overhead in reconfigurable intelligent surface (RIS)-aided URLLC system.

BACKGROUND

The following abbreviations are herewith defined, at least some of which are referred to within the following description: New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), User Equipment (UE), Evolved Node B (eNB), Next Generation Node B (gNB), Uplink (UL), Downlink (DL), Central Processing Unit (CPU), Graphics Processing Unit (GPU), Field Programmable Gate Array (FPGA), Orthogonal Frequency Division Multiplexing (OFDM), Radio Resource Control (RRC), User Entity/Equipment (Mobile Terminal), Transmitter (TX), Receiver (RX), Reconfigurable Intelligent Surface (RIS), Large Intelligent Surface (LIS), Intelligent Reflecting Surface (IRS), line of sight (LOS), Non Line of Sight (NLOS), actuator (AC), Industrial internet-of-things (IIoT), ultra-reliable and low-latency communication (URLLC), enhance mobile broadband (cMMB), massive machine-type communication (mMTC), base station (BS), transmission-reception point (TRP), channel state information (CSI), sounding reference signal (SRS), delay outage rate (DOR), cumulative distribution function (CDF), Signal-to-Noise Ratio (SNR).

Industry 4.0 is aimed to achieve digital transformation of decentralized manufacturing or products and factory automation to reduce human involvement in the industrial processes. Industrial internet-of-things (IIoT) in Industry 4.0 can guarantee cyber-physical systems through modern control systems to real-time connect the actuators (AC), automatic robots and machines across the smart factory. As such, wireless communication is employed in the smart factory to provide higher flexibility of machines and lower infrastructure cost. However, the existing wireless systems cannot well meet the ultra-high reliability, high availability, and very low latency requirements for the emerging mission-critical IIoT applications.

Compared with previous cellular systems, ultra-reliable and low-latency communication (URLLC) in the fifth-generation (5G) networks can be categorized as one of three main types of services, also including enhance mobile broadband (eMMB) and massive machine-type communication (mMTC), to achieve ultra-reliability requirements. For example, factory automation applications require a packet loss rate lower than $10^{-9}$ and end-to-end latency of less than 1 ms to ensure mission-critical communications. Hence, URLLC can provide trustworthy support for these IIoT applications to address the requirements of Industry 4.0. It cannot be ignored that high-reliability performance still may decrease for mission-critical IIOT applications. This is because the wireless propagation environment in the factory is more complex than other indoor environments due to multipath fading by the effect of dense machines. Thus, a complementary solution to achieve high reliability and low latency is necessary in the smart factory.

Reconfigurable Intelligent Surface (RIS), which can be alternatively referred to as Large Intelligent Surface (LIS), Intelligent Reflecting Surface (IRS) or Intelligent Metasurface, is an emerging technology. RIS is a large and thin metasurface of metallic or dielectric material, comprised of an array of passive sub-wavelength scattering elements with specially designed physical structure. The elements can be controlled in a software-defined manner to change the electromagnetic (EM) properties (e.g. phase shift) of the reflection of the incident radio frequency (RF) signals. By a joint phase control of all scattering elements, the reflected radiation pattern of the incident RF signals can be arbitrarily tuned in real time, thus creating new degrees of freedom to the optimization of the overall wireless network performance. RIS can real-time control the response of electromagnetic wave effectively, and is considered as one of the potential key technologies for 6G systems.

Although more active elements at an RIS mean potential better performance, i.e., higher reliability, the overhead to obtain such benefit is increased, such as the channel estimation procedure with more pilot signals, which always breaks the limitation on the latency requirement. Thus, the RIS deployment is necessary to be carefully designed for a URLLC application with the requirements on both high reliability and low latency.

A typical deployment of RIS in a modern mobile communication system (e.g. RIS-aided URLLC system in a smart factory) is illustrated in FIG. 1, where the RIS (e.g. located on the wall or the ceiling of the smart factory) is controlled by a base station (BS), e.g. gNB or TRP, via a dedicated interface (note that the interface may be defined if the RIS is regarded as a new node category in 6G networks). The RIS forwards the signal from the BS to the target user equipment (UE), e.g. an automatic robot. That is, the RIS forms a cascaded channel between the BS and the UE. The propagation path BS-RIS-UE can be tuned by the selected reflection coefficients in the elements to satisfy some requirements, such as coverage and higher received power. Due to RIS's passive feature, it is challenging to obtain perfect channel state information (CSI). Typically, the current beamforming design for RIS-aided communications should be estimated. The number of the channel coefficients is in total K×M×N+K×M, where K, N and M denote the number of antennas at UE users, the number of reflecting elements at the RIS, and the number of antennas at the BS, respectively, which can be large, especially in a massive MIMO system.

In the working phase, the RIS would receive and then re-radiate (i.e., reflect) the radio signals from the BS (e.g. gNB), and the controller within the RIS configures the amplitudes and phase shifts of all active elements in real-time by receiving dedicated signals from the BS. As the key issue in this RIS-aided communication, the CSI between these three nodes (between gNB and UE, between gNB and RIS, between RIS and UE) should be well estimated by gNB to obtain the expected coefficients. The typical derivation procedure is shown in FIG. 2, where the gNB requests the target UE to send reference signals to assist channel estimation. The reference signals should cover all elements (which can be also referred to as reflecting elements) at the RIS for gNB to calculate the expected coefficients. Once deriving the values, gNB would assign them to the RIS for the following communication with the target UE.

For example, as a typical setting in 5G, if there are 32 antennas at gNB (M=32) and 4 antennas at UE (K=4), respectively, the 64 elements at RIS (N=64) can result in a total of 8320 channel coefficients to be estimated, which is a huge number for the reference signals, such as sounding reference signal (SRS) or CSI-RS, in the time domain. Thus, it needs much more time to obtain the coefficients before the next transmission, which is not expected for the URLLC application.

This invention targets reasonably selecting the number of active reflecting elements at RIS while achieving high reliability and low latency requirements simultaneously.

BRIEF SUMMARY

Methods and apparatuses for reducing the overhead in RIS-aided URLLC system are disclosed.

In one embodiment, a method comprises determining, by applying delay outage rate (DOR) metric, an active number of reflecting elements at an RIS between the base station and a UE in an RIS-aided URLLC system; and setting the active number of reflecting elements to the RIS.

In one embodiment, a direct channel blocking or a deep fading is between the base station and the UE, and a cascaded channel exists between the base station and the UE via the RIS.

In some embodiment, the statistics of the received SNR over the cascaded channel is being reported from the UE to the base station. The statistics may include cumulative density function (CDF). The statistics may include cumulative density function (CDF).

In some embodiment, the active number of reflecting elements at the RIS is determined by the DOR metric meeting a requirement.

In another embodiment, a base station comprises a processor that determines, by applying delay outage rate (DOR) metric, an active number of reflecting elements at an RIS between the base station and a UE in an RIS-aided URLLC system; and a transmitter that sets the active number of reflecting elements to the RIS.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
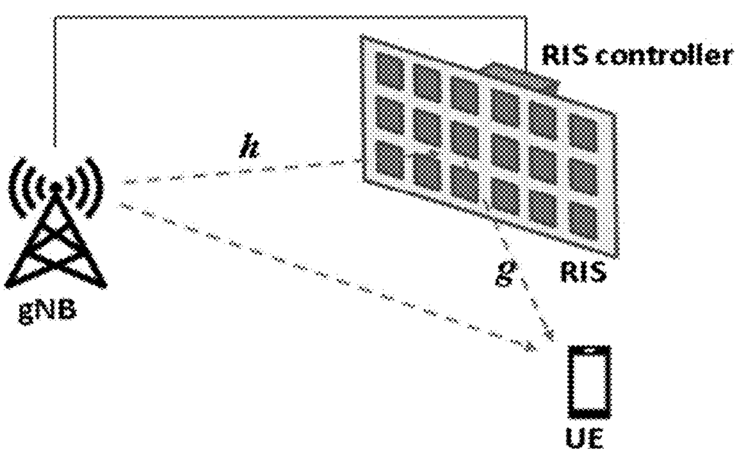
FIG. 1 illustrates a typical deployment of RIS in a modern mobile communication system.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

The present application proposes to determine the number of active elements at the given RIS as least as possible to reduce the time to obtain the coefficients, while achieving reliability and latency requirements simultaneously, which is friendly for URLLC applications.

According to the present application, a metric, i.e. delay outage rate (DOR), that is used to indicate the decoding delay in terms of achievable block error probability $\bar{\varepsilon}$, is introduced. The DOR can jointly evaluate the high reliability and low latency in URLLC.

Figure 2:
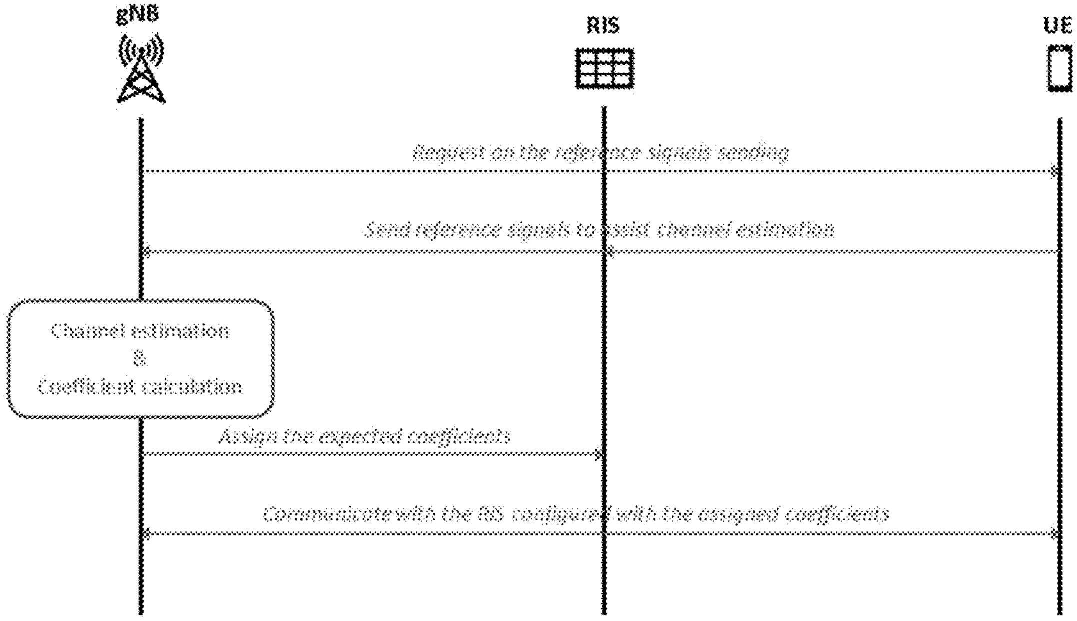
FIG. 2 illustrates a typical derivation procedure.
Figure 3:
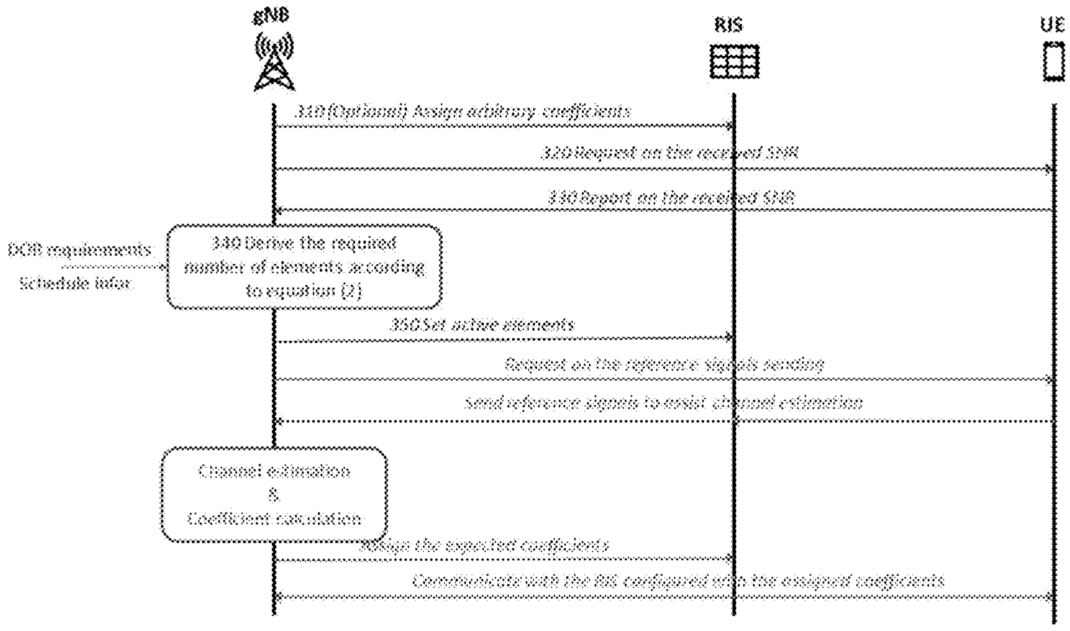
FIG. 3 illustrates an embodiment of the present application.

FIG. 3 illustrates an embodiment of the present application. In addition to the steps illustrated in FIG. 2, steps 310 to 350 are added so that the number of active elements at the RIS as least as possible is determined.

In an optional step 310, arbitrary coefficients of the elements are assigned. The arbitrary coefficients can be assigned by BS (e.g. gNB). In practice, step 310 can be done by doing nothing.

In step 320, the BS (e.g. gNB) requests the UE to report the received SNR. For example, the request (e.g. a pilot signal) may be included in a random access process or in paging information, and transmitted with a transmit power.

In step 330, upon receiving the request, the UE reports the received SNR. For example, the received SNR can be included in an access request.

In step 340, based on the reported SNR, along with the schedule information (such as bandwidth and load) and the target DOR value, the BS (e.g. gNB) calculates the number of expected active elements at RIS according to the CDF function as derived in equation (2) (that will be discussed later).

In step 350, the BS (e.g. gNB) sets, to the RIS, the active number of elements at the RIS according to the calculation result.

Figure 4:
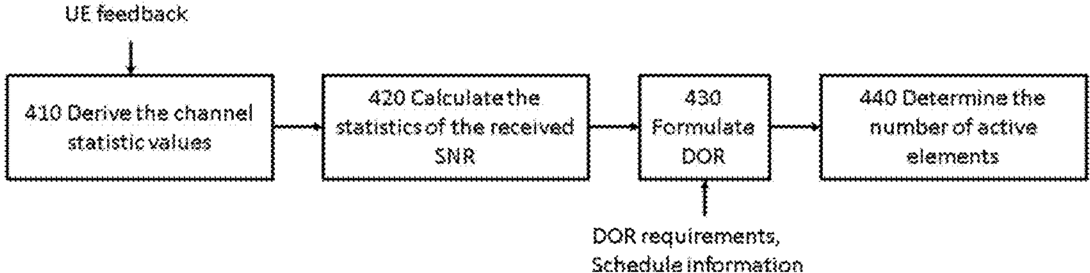
FIG. 4 illustrates a flow diagram of the procedures performed at gNB.

FIG. 4 further illustrates a flow diagram of the steps performed at gNB to obtain the number of active reflecting elements at RIS (e.g. during data transmission over a URLLC system in the smart factory).

Before describing FIG. 4, the steps of 320 and 330 are described in detail.

As shown in FIG. 1, in an RIS-aided URLLC system, during the communication between the BS and the UE via the RIS, the first-stage signal is transmitted from the BS to the RIS through channel h, then the second-stage signal is reflected from the RIS to the UE through channel g. The transmission and reception of data in the RIS-aided URLLC system are carried out through channels h and g.

The received signal at UE (in step 320) is given by $$y_D = \sqrt{P}\left(\sum_{i=1}^{N} h_i \xi_i e^{j\phi_i} g_i\right)x + n_0,$$

where P is the transmit power at the BS, x is the transmit symbol with unit power and $n_0$ is the additive white Gaussian noise with the mean of zero and the variance of $N_0$. In addition, $\xi_i e^{j\phi_i}$ is the $i^{th}$ reflection coefficient, where $\xi_i=1$ for the ideal phase shifts $\phi_i \in [0, 2\pi]$ with i=1, 2, . . . , N.

Accordingly, the instantaneous received SNR at the UE can be obtained as $$\gamma_D = \frac{P\left|\sum_{i=1}^{N} \alpha_i \beta_i e^{j(\phi_i - \theta_i - \varphi_i)}\right|^2}{N_0 d_{h_i}^{\epsilon} d_{g_i}^{\epsilon}} = \left(\sum_{i=1}^{N} \alpha_i \beta_i e^{j\psi_i}\right)^2 \overline{\gamma},$$

where $$\overline{\gamma} = P/N_0 d_{h_i}^{\epsilon} d_{g_i}^{\epsilon}$$

is the average SNR and the phase error $\psi_i=\phi_i-\theta_i-\varphi_i$ occurs due to the hardware impairment. $\psi_i$ is kept as the phase error. Particularly, it is assumed that the phase error $\psi_i$ is uniformly distributed in [0, 2π]. So, the result can be regarded as a lower bound of the performance when the perfect CSI is known at the RIS.

It is assumed that the wireless channels experience Rician fading effect, although other fading effects can be experienced. The model Rician fading effect is more practically used for wireless communication systems with LoS (light of sight) between transmitter and receiver. Meanwhile, phase errors are also considered.

The statistics of the sum of N cascaded Rician fading with phase errors in terms of CDF can be obtained as the following equation (1):

$$F_{\gamma_D}(\gamma) = \sum_{a_1=0}^{\infty}\sum_{a_2=0}^{\infty}\sum_{k_1=0}^{\infty}\cdots\sum_{a_1=0}^{\infty}\sum_{a_2=0}^{\infty}\sum_{k_N=0}^{\infty} C_4 \prod_{i=1}^{N} \frac{(-a_2)_{k_i}}{k_i!}\frac{(a_2+1)_{a_1-k_i}}{(a_1-k_i)!}\left(1-\frac{2^{1-u}}{(u-1)!}\left(\frac{\sqrt{\gamma}}{\sqrt{\sigma_1^2\sigma_2^2\overline{\gamma}}}\right)^u K_u\left(\frac{\sqrt{\gamma}}{\sqrt{\sigma_1^2\sigma_2^2\overline{\gamma}}}\right)\right).$$

The above equation (1) is derived assuming the channel is Rician fading. However, in practice, the typical deployment scenario of URLLC is in the factory, where the terminals are always static. In this condition, the CDF function can be well derived in gNB in the initial access procedure.

In short, when the BS sends the pilot signal with a transmit power over wireless channel to the UE, the UE receives the pilot signal through the wireless channel that is based on the transmit power, a coherence time for the channel, a noise power, and the channel gain, which is a random variable.

For an RIS-aided system, the CDF of the received SNR is related to the active number (N) of reflecting elements at the RIS. The BS and the UE can be equipped with a single antenna or multiple antennas.

In step 410 (corresponding to step 330), when the BS receives UE feedback (i.e. the reported SNR by the UE), the channel statistic values (e.g. the transmit power, the coherence time for the channel, and the noise power) can be derived from the UE feedback. So, the reported SNR is a function of the channel gain.

In step 420, the channel gain is modeled to calculate the statistics of the received SNR (e.g. according to equation (1)).

DOR is defined as the probability that the successful delivery time $T_D$ to transmit a certain amount of data in a wireless channel is higher than a delay threshold $T_{th}$.

The value of $T_D$ to deliver H bits can be indicated as $$T_D = \frac{H}{R_D},$$

where $R_D$ is the actual rate for the transmission depending on the channel block-length L and achievable block error probability ε, expressed as $$R_D = C(\gamma) - Q^{-1}(\varepsilon)\sqrt{\frac{V(\gamma)}{W}} + O\left(\frac{\log_2(\gamma)}{W}\right),$$

where $C(\gamma)=B\log_2(1+\gamma)$ is the maximum instantaneous transmission rate from Shannon capacity theorem with channel bandwidth B, W is the channel block length, $V(\gamma)=1-(1+\gamma)^{-2}$ is the channel dispersion, $Q^{-1}(\varepsilon)$ is the inverse of Q-function for ε and $$O\left(\frac{\log_2(\gamma)}{W}\right)$$

is the higher order terms of Taylor series. The Shannon capacity theorem applies to set up the performance limits for the small packets over URLLC fading channels, that is, $C(\gamma)=\max(R_D)=B\log_2(1+\gamma_D)$.

Then, the DOR can be obtained as equation (2):

$$DOR = Pr\left[\frac{H}{C(\gamma)} > T_{th}\right] = Pr\left[\frac{H}{B\log_2(1+\gamma)} > T_{th}\right] = F_{\gamma D}\left(2^{\frac{H}{T_{th}B}} - 1\right)$$

where $\gamma$ is the received SNR, and $F_{\gamma D}(\bullet)$ is the cumulative distribution function (CDF) of the received SNR.

DOR can provide reliability and latency performance, simultaneously. Thus, the conventional analysis framework of wireless transmission systems with infinite packets is transformed into a data-oriented analysis framework for mission-critical IIOT applications along with small packets where the amount of data (i.e. H) and available bandwidth (i.e. B) play an essential role in the performance evaluation.

When the equation (1) is combined with equation (2), it can be seen that DOR is dependent on channel bandwidth (B), the amount of data (H), the delay threshold duration time ($T_{th}$) and CDF (which is related to the active number of reflecting elements at RIS (N)). The channel bandwidth (B), the amount of data (H), and the delay threshold duration time ($T_{th}$) are known values (that can be collectively referred to as schedule information). So, DOR is dependent on the active number of reflecting elements at RIS (N). From another point of view, if an expected DOR is configured, the active number of reflecting elements at RIS (N) can be determined according to the expected DOR.

In step 430, the expected DOR can be formulated in terms of the channel bandwidth (B), the amount of data (H) and the delay threshold duration time ($T_{th}$). For example, in the automation application in smart factory, the expected DOR can be configured as DOR less than $10^{-9}$ (where the delay threshold duration time ($T_{th}$) is 0.001 s (i.e. 1 ms)) to fulfill the requirements of URLLC in the smart factory. For another example, the expected DOR can be configured as DOR less than $10^{-6}$ (or DOR between $10^{-6}$ and $10^{-7}$) for VR or AR applications.

In step 440, based on the expected DOR, the number of active elements at RIS (N) can be determined.

As a whole, the expected DOR is used in calculations to determine the optimal number of reflecting elements at RIS to fulfill the requirements of URLLC in the smart factory, e.g., DOR less than $10^{-9}$ and threshold duration less than 1 ms.

The optimal number of the active elements at RIS is notified to the RIS (step 350).

Figure 5:
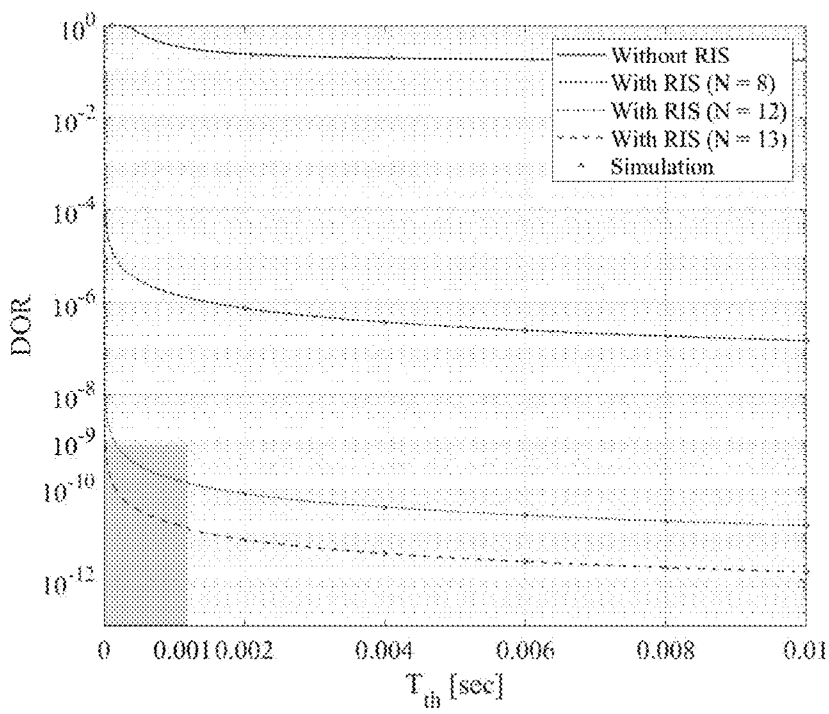
FIG. 5 illustrates analytical results.

As shown in FIG. 5 (when $$v_1^2 = v_2^2 = 1,\ \sigma_1^2 = \sigma_2^2 = 1/2,$$

H=5 kbits, B=2 MHz and $\bar{\gamma}$=10 dB), the DOR is evaluated as a function of delay threshold $T_{th}$ with and without the RIS.

Firstly, the analytical results match well with Monte Carlo simulation. It can be seen from FIG. 5 that the DOR performance shows, for any of "without RIS", "with RIS (N=8)", "with RIS (N=12)", "with RIS (N=13)" (where N is the number of reflecting elements at RIS), a trend from decline to stability when the delay threshold $T_{th}$ increases. This is because more data can be successfully transmitted with the increasing delay threshold. In addition, it can be observed that, for any given delay threshold $T_{th}$ (e.g. $T_{th}$=0.001 s, i.e. 1 ms), DOR can provide better performance as the number of reflecting elements at RIS (i.e. N) increases. Especially, the traditional communication (i.e., without RIS) only supports the reliability of more than $10^{-1}$, which cannot support URLLC applications. On the other hand, with RIS, when the number of reflecting elements (i.e. N) increases, much more ultra-reliability (e.g. with a latency of 1 ms) can be supported. Therefore, the deployment of RIS can support mission-critical IIoT applications over URLLC, and these curves can be regarded as the design guideline for how many numbers of reflecting elements at RIS (i.e. N) should be provided to meet the requirement of higher reliability along with lower latency. For example, when DOR is less than $10^{-9}$ and threshold duration is less than 1 ms (to support factory automation applications), N shall be larger than 13 in FIG. 5. Therefore, the deployment of RIS can support mission-critical IIoT applications over URLLC, and these curves can be regarded as the design guideline for how many numbers of reflecting elements at RIS (i.e. N) should be provided to meet the requirement of higher reliability along with lower latency.

Figure 6:
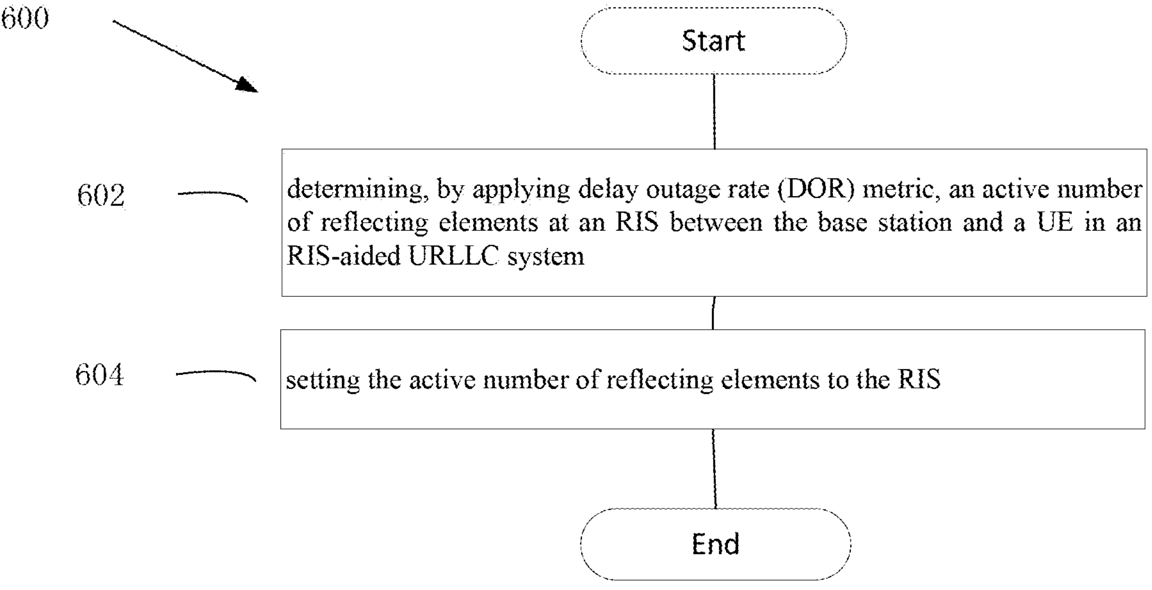
FIG. 6 is a schematic flow chart diagram illustrating an embodiment of a method.

FIG. 6 is a schematic flow chart diagram illustrating an embodiment of a method 600 according to the present application. In some embodiments, the method 600 is performed by an apparatus, such as a base station. In certain embodiments, the method 600 may be performed by a processor executing program code, for example, a microcontroller, a microprocessor, a CPU, a GPU, an auxiliary processing unit, a FPGA, or the like.

The method 600 may include 602 determining, by applying delay outage rate (DOR) metric, an active number of reflecting elements at an RIS between the base station and a UE in an RIS-aided URLLC system; and 604 setting the active number of reflecting elements to the RIS.

In particular, a direct channel blocking or a deep fading is between the base station and the UE, and a cascaded channel exists between the base station and the UE via the RIS.

In some embodiment, the statistics of the received SNR over the cascaded channel is being reported from the UE to the base station. The statistics may include cumulative density function (CDF).

In some embodiment, the active number of reflecting elements at the RIS is determined by the DOR metric meeting a requirement.

Figure 7:
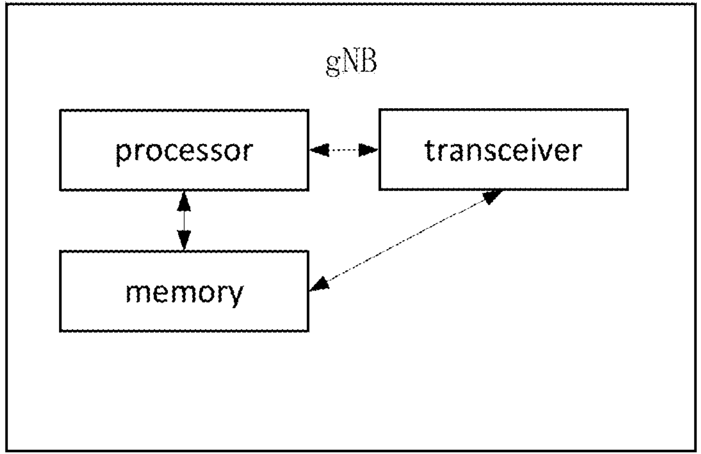
FIG. 7 is a schematic block diagram illustrating apparatuses according to one embodiment.

FIG. 7 is a schematic block diagram illustrating apparatuses according to one embodiment.

Referring to FIG. 7, the base station (e.g. gNB) includes a processor, a memory, and a transceiver that is a transmitter and/or a receiver. The processors implement a function, a process, and/or a method which are proposed in FIG. 6.

The base station comprises a processor that determines, by applying delay outage rate (DOR) metric, an active number of reflecting elements at an RIS between the base station and a UE in an RIS-aided URLLC system; and a transmitter that sets the active number of reflecting elements to the RIS.

In particular, a direct channel blocking or a deep fading is between the base station and the UE, and a cascaded channel exists between the base station and the UE via the RIS.

In some embodiment, the statistics of the received SNR over the cascaded channel is being reported from the UE to the base station. The statistics may include cumulative density function (CDF).

In some embodiment, the active number of reflecting elements at the RIS is determined by the DOR metric meeting a requirement.

Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a base station, the method comprising:

determining, by applying a delay outage rate (DOR) metric, an active number of reflecting elements at a reconfigurable intelligent surface (RIS) between the base station and a user equipment (UE) in an RIS-aided ultra-reliable low latency communications (URLLC) system;

receiving from the UE statistics of a received signal-to-noise ratio (SNR) over a cascaded channel, wherein, the statistics include a cumulative density function (CDF) of the received SNR; and setting the active number of reflecting elements to the RIS, wherein applying the DOR metric includes determining the active number of reflecting elements using the CDF of the received SNR.

2. The method of claim 1, wherein, a direct channel blocking or a deep fading is between the base station and the UE, and the cascaded channel exists between the base station and the UE via the RIS.

3. The method of claim 1, wherein, the active number of reflecting elements at the RIS is determined when the DOR metric is below a threshold DOR value.

4. A base station, comprising:

at least one memory; and at least one processor coupled with the at least one memory and configured to cause the base station to:

determine, by applying a delay outage rate (DOR) metric, an active number of reflecting elements at a reconfigurable intelligent surface (RIS) between the base station and a user equipment (UE) in an RIS-aided ultra-reliable low latency communications (URLLC) system;

receive, from the UE, statistics of a received signal-to-noise ratio (SNR) over a cascaded channel, wherein, the statistics include a cumulative density function (CDF) of the received SNR; and set an active number of reflecting elements to the RIS, wherein applying the DOR metric includes determining the active number of reflecting elements using the CDF of the received SNR.

5. The base station of claim 4, wherein, a direct channel blocking or a deep fading is between the base station and the UE, and the cascaded channel exists between the base station and the UE via the RIS.

6. The base station of claim 4, wherein, the active number of reflecting elements at the RIS is determined when the DOR metric is below a threshold DOR value.

* * * * *